United States Patent [19]

Braga et al.

[11] Patent Number: 5,840,109
[45] Date of Patent: Nov. 24, 1998

[54] MIXTURES OF BITUMEN AND OLEFIN POLYMERS SUITABLE FOR MODIFYING BITUMENS

[75] Inventors: Vittorio Braga; Franco Sartori, both of Ferrara, Italy

[73] Assignee: Montell North America Inc., Wilmington, Del.

[21] Appl. No.: 804,724

[22] Filed: Feb. 21, 1997

[30] Foreign Application Priority Data

Feb. 23, 1996 [IT] Italy .................................. MI96A0348

[51] Int. Cl.$^6$ .................................................. C09D 195/00
[52] U.S. Cl. ........................... 106/273.1; 524/59; 524/70; 524/71
[58] Field of Search ........................... 106/273.1; 524/59, 524/70, 71

[56] References Cited

U.S. PATENT DOCUMENTS

| | | | |
|---|---|---|---|
| 4,368,228 | 1/1983 | Gorgati | 428/110 |
| 4,420,524 | 12/1983 | Gorgati | 428/110 |
| 4,771,090 | 9/1988 | Kehr et al. | 524/68 |
| 5,326,798 | 7/1994 | Danese | 524/70 |
| 5,437,923 | 8/1995 | Kalkanoglu | 428/291 |
| 5,516,817 | 5/1996 | Slusher et al. | 523/179 |

FOREIGN PATENT DOCUMENTS

| | | |
|---|---|---|
| 0 131 397 A1 | 1/1985 | European Pat. Off. . |
| 0 400 333 A2 | 12/1990 | European Pat. Off. . |
| 0 472 946 A2 | 3/1992 | European Pat. Off. . |
| 0 524 624 A2 | 1/1993 | European Pat. Off. . |
| 0 592 852 B1 | 4/1994 | European Pat. Off. . |
| 0 604 908 A2 | 7/1994 | European Pat. Off. . |
| 0 604 917 B1 | 7/1994 | European Pat. Off. . |
| 0 632 066 A1 | 1/1995 | European Pat. Off. . |
| 0 667 374 A2 | 8/1995 | European Pat. Off. . |
| 1 047 828 | 11/1966 | United Kingdom . |

*Primary Examiner*—David Brunsman

[57] ABSTRACT

Mixtures containing bitumen and at least one polymer selected from (A) an essentially atactic propylene homopolymer, (B) an amorphous propylene copolymer with a $C_4$–$C_{10}$ α-olefin, and (C) an amorphous propylene copolymer with ethylene; the polymers (A) and (B) having the following characteristics:

intrinsic viscosity (η): greater than 1 dl/g;

% (r)–% (m)>0, where % (r) is the percentage of the syndiotactic dyads, and % (m) is the percentage of the isotactic dyads;

less than 2% of the $CH_2$ groups are contained in the $(CH_2)_n$ sequences where n≧2; and Bernoulli index (B)=1±0.2;

the copolymer (C) having the following characteristics:

the quantity of propylene in the copolymer (%P), expressed in mole percentage, and the EPE/(EPE+PPE+PPP) triad ratio satisfy the following equation:

$$0.01 \leq \%P + EPE/(EPE+PPE+PPP) \geq 1;$$

and less than 2% of the $CH_2$ groups are contained in the $(CH_2)_n$ sequences where n is an even number.

8 Claims, No Drawings

MIXTURES OF BITUMEN AND OLEFIN POLYMERS SUITABLE FOR MODIFYING BITUMENS

BACKGROUND OF THE INVENTION

The present invention concerns mixtures comprising bitumen and essentially atactic or amorphous propylene polymers, more specifically essentially atactic homopolymers of propylene and/or its amorphous copolymers, and the process for the preparation of said mixtures.

Said polymers are introduced into the bitumens with the purpose of modifying the characteristics of the latter in order to render them more suitable for their intended use.

Bitumens have various applications, in particular the bituminous mixtures of the present invention are suitable for the preparation of waterproof coating to be used, for example, to cover roofs; however, they can find applications in other sectors as well, such as for the preparation of materials for road paving.

It is already known in the art that adding the proper polymer substances to bitumens causes the improvement of important characteristics, such as softening point, penetrability and flexibility. Among the known polymer substances used in the art are the amorphous olefin polymers, in particular amorphous polypropylene both as homopolymer and copolymer. Said amorphous polymers, which are the by-products of polymerization reaction with Ziegler-Natta catalysts used for the production of isotactic olefin polymers, primarily the polypropylene, are removed from the reaction products by washing.

However, said amorphous polymers, which have a low molecular weight and contain low molecular weight crystalline fractions, are difficult to produce in lots having properties that are constant and that can be reproduced.

Now it has been found that the bituminous mixtures for waterproof coating containing particular atactic or amorphous polymers obtained with metallocene catalysts show the same properties, such as softening point, penetrability, flexibility, and ductility, notwithstanding a significantly lower content of polymer, with respect to the bituminous mixtures for waterproof coating containing amorphous polymers obtained with the Ziegler-Natta catalysts. Moreover, the bituminous mixtures for road paving containing the above mentioned atactic or amorphous polymers obtained with metallocene catalysts display one or more improved properties, such as a high softening point, and/or a lower degree of penetrability, and/or greater ductility (elastic recovery).

In addition thanks to the presence of the above mentioned polymer, the bituminous mixtures of the present invention acquire a greater adhesive quality. Said increased adhesiveness is a considerable advantage because, for example, it improves the sealing properties of the bituminous mixtures whether they are applied hot or at ambient temperature. In particular, the mixtures of the present invention display a good adhesive quality even at ambient temperature.

SUMMARY OF THE INVENTION

Therefore, object of the present invention is a mixture comprising bitumen and at least one polymer selected from (A) an essentially atactic propylene homopolymer, (B) one of its copolymers with a $C_4$–$C_{10}$ α-olefin, and (C) an amorphous propylene copolymer with ethylene. Said polymers (A) and (B) having the following characteristics:

intrinsic viscosity (η): greater than 1, preferably ranging from 1 to 15, more preferably from 1 to 3, dL/g;

% (r)−% (m)>0, where % (r) is the percentage of the syndiotactic dyads, and % (m) is the percentage of the isotactic dyads;

less than 2% of the $CH_2$ groups are contained in the $(CH_2)_n$ sequences where n≧2; and Bernoulli index (B)=1±0.2;

Copolymer (C) having the following characteristics:

the quantity of propylene in the copolymer (%P), expressed in mole percentage, and the EPE/(EPE+PPE+PPP) triad ratio satisfy the following equation:

$$0.01 \leq \%P + EPE/(EPE+PPE+PPP) \leq 1; \text{ and}$$

less than 2% of the $CH_2$ groups are contained in the $(CH_2)_n$ sequences where n is an even number.

DETAILED DESCRIPTION OF THE PREFERRED EMBODIMENTS

The above mentioned Bernoulli index is defined as:

$$B=4 [mm][rr]/[mr]^2$$

where [mm], [rr], and [mr] represent, respectively, the percentage of the isotactic triads, syndiotactic triads, and heterotactic triads in the polymer determined by way of $^{13}$C-NMR analysis. Said index has values close to 1 (one), in particular ranging from 0.8 to 1.2, preferably from 0.9 to 1.1.

The $C_4$–$C_{10}$ α-olefins, branched or linear, are preferably selected from 1-butene, 1-pentene, 4-methyl-1-pentene, 1-hexene, and 1-octene. The particularly preferred α-olefins are 1-butene, 1-hexene, and 1-octene.

The quantity of comonomer(s) ranges preferably from 10 to 70%, more preferably from 15 to 60%, by weight with respect to the weight of the copolymer.

The above mentioned copolymers of propylene with ethylene may optionally contain minor quantities of diene, from 0.5 to 4% for example; examples of dienes that may be used are: butadiene, isoprene, 1,4-hexadiene, 1,5-hexadiene, 1,6-hexadiene.

The definition of "essentially atactic polymers" refers to those polymers that have a basically atactic structure, where the isotactic dyads are quantitatively not very different from the syndiotactic dyads. That notwithstanding, it has been noticed that the syndiotactic dyads (r) in said polymers are present in greater number than the isotactic dyads (m), i.e., % (r)−% (m)>0, preferably % (r)−% (m)>5. These polymers are practically free of crystallinity.

Essentially atactic and amorphous polymers having said characteristics are described in European patent application EP-A-604917. The amorphous copolymers of propylene with ethylene having said characteristics are described in European patent application EP-A-632066. Said homopolymers and copolymers are obtained with homogeneous catalysts based of Zr, Ti, or Hf metallocenes, and with alkylalumoxanes as cocatalyst.

In addition to the essentially atactic and amorphous polymers mentioned above, the mixture of the present invention can also contain other types of polymers. For example, the mixture may comprise one or more olefinic or nonolefinic polymers. In particular, one can add to the bitumen mixture amorphous polymers (such as ethylene-propylene rubbers), low or high density polyethylene, styrene-butene-styrene (SBS) copolymers, ethylene polyvinyl acetate, crystalline polyolefins (homopolymers and copolymers of $C_2$–$C_8$ α-olefins), in particular isotactic polypropylene (preferably with a solubility in xylene greater than 90% by weight) and ethylene-propylene random copolymers, and heterophasic polymer compositions. The latter comprise a crystalline polyolefin matrix and a rubber portion of an ethylene-propylene polymer; generally speaking, the matrix is isotactic polypropylene, optionally containing up to 15% by weight of an olefin comonomer.

Examples of heterophasic polymer compositions suitable for the use in the mixture of the present invention are those described in European patent applications EP-A-400333 and EP-A-472946.

The mixtures of the present invention whose formulation is suitable for road paving, give a better performance if they contain a quantity of crystalline polyolefins (homopolymers and copolymers of $C_2$–$C_8$ α-olefins), and/or amorphous polyolefins; preferably said crystalline polyolefins are isotactic polypropylene or propylene-ethylene random copolymers, containing up to 10% by weight of ethylene, and the amorphous polyolefins are ethylene-propylene rubber copolymers containing from 20 to 50% by weight of ethylene.

In addition to the above components, the mixtures of the present invention can also contain known substances that are commonly added to bitumens, for example inert mineral fillers, such as calcium carbonate, silicon monoxide, and mica, in the usual quantities.

The amount of said atactic or amorphous polymers in the mixture generally ranges from 1 to 40% by weight with respect to the total weight of the bituminous mixture when no other type of polymer is added to the mixture. More particularly, the quantity of atactic or amorphous polymers depends on the use for which the bituminous mixture is intended. For example, their content in bituminous mixtures for waterproof coating preferably ranges from 2 to 40%, more preferably from 2 to 25%, by weight while for the materials destined for road paving, for example, the quantity of said polymers ranges from 1 to 10% by weight with respect to the total weight of the bituminous mixture.

Moreover, as previously stated, the bituminous mixture may contain at least one other type of polymer in addition to the above mentioned atactic or amorphous polymers. Generally the above mentioned additional polymers are added, for example, in quantities greater than or equal to 0.5%, preferably from 0.5 to 24%, by weight with respect to the weight of the mixture; however, in the case of the mixtures destined for road paving, said quantity generally ranges, for example, from 0.5 to 9%, preferably from 0.5 to 7%, by weight with respect to the weight of the mixture. Even when other polymers are present, the total quantity of polymers in the bituminous mixture is less than or equal to 40%, preferably 25%, by weight with respect to the total weight of the mixture in the case, for example, where the mixture is used for waterproof coating. Said total quantity of polymer is preferably less than or equal to 10% by weight with respect to the total weight of the mixture used for road paving. In said mixtures the quantity of polymer or polymers (A), (B), and (C) is not less than 1% by weight with respect to the total weight of the mixture, preferably not less than 3% by weight if the mixture is used for waterproof coating.

The polymers are incorporated into the bitumen according to known mixing methods and/or techniques.

One of the preferred methods to prepare said mixtures consists of adding the polymer to the bitumen preheated to a temperature which is greater than the one of the softening point of the polymers to be added. Depending on the viscosity of the bitumen and the polymers, the mixers used are the ones that allow an effective dispersion of the polymer in the bitumen. As a way of example, one can use a mixer as described in the process of the examples. The mixing may also be carried out in two stages: first one prepares a concentrate with a high content of polymer in the bitumen, then the concentrate is mixed to the remaining portion of the preheated bitumen, as described in European patent application EP-A-321189 published on behalf of Himont Incorporated.

The following examples are given in order to illustrate but not limit the present invention.

The data reported in the examples relative to the following polymers' properties have been determined by the methods indicated below:

| Properties | Method |
|---|---|
| Melt Index (MI) | ASTM-D 1238, condition L |
| Intrinsic Viscosity | Determined in tetrahydronaphthalene at 135° C. |
| Soluble in xylene | (see note below) |
| Flexural modulus of elasticity | ASTM-D 790 |

Note
Determination of the percentage of soluble in xylene: one prepares a solution of the sample in xylene at a 1% concentration by weight, maintaining the sample in xylene at 135° C. while stirring for one hour. While continuing to stir the solution is allowed to cool to 95° C., after which it is poured into a bath heated at 25° C where it is kept for 20 minutes without stirring, and for 10 minutes while stirring. The solution is then filtered, and to a portion of the filtrate one adds acetone in order to obtain the precipitation of the dissolved polymer. Said polymer is then recovered, washed, dried, and weighed in order to determine the percentage soluble in xylene.

The properties of the bituminous mixtures containing the atactic polymer have been determined as follows:

| Properties | Method |
|---|---|
| Penetration | ASTM D-5 |
| Softening point (Ball and Ring, B&R) | ASTM D-36 |
| Ductility | ASTM D-113-86 |
| Brookfield viscosity | Determined with Brookfield viscometer |
| Shore A hardness | ASTM D 2240 |
| Peeling test | (see below) |
| Cold flexibility | UNI 8202/15 |

Cold flexibility is a parameter correlated to the embrittlement temperature. Said temperature corresponds to the temperature where a hand-punched sample, prepared as described below, breaks when it is flexed at 180° C. according to the method mentioned above.

Peeling Test
One prepares a solution of xylene at 6% by weight of the polymer to be evaluated.

The support used in the test is a panel comprising a layer of 1.5 mm thick foamed polyethylene, and a 0.5 mm thick layer of a soft thermoplastic polypropylene. The samples are 150 mm long and 25 mm wide. The solution is placed as an adhesive on the foamed polyethylene side of the samples. After evaporation of the solution's solvent (2 hours at ambient temperature) the sides with the adhesive of two samples are made to fit together, and the sample is pressed by hand using a roller made for this purpose. After conditioning for 24 hours at 23+ C., the two samples are separated, at ambient temperature, using a separation rate of 50 mm/min.

Two types of bitumen are used for the tests: the bitumen prepared by way of visbreaking (VB), and the one obtained by straight run (SR). The bitumen used in the tests have the properties and asphaltenes content indicated in table 1.

TABLE 1

| Bitumen | B&R °C. | Penetration dmm | Ductility % | Asphaltenes (C7$^+$) % | Viscosity 60° C. Pa.s |
|---|---|---|---|---|---|
| VB | 43 | 162 | 5 | 20.7 | 10–15 |
| SR-2 | 44 | 170 | 10 | 8.9 | 35–40 |
| SR-4 | 47 | 135 | 10 | 11.8 | 25–30 |

The mixtures for waterproof coating have been obtained with bitumens belonging to the permeability class of 180°–200° tenths of a millimeter, measured at 25° C., and having an embrittlement temperature ranging from −5 to 0° C. and an B&R of 40°–50° C.

The polymers used for the preparation of the bituminous mixtures are as follows:

Polymer A: atactic propylene homopolymer, totally soluble in xylene, having an intrinsic viscosity of 2.57 dL/g, %(r)−% (m) =17.8, and B=0.99; the polymer is produced using dimethyl bis(9-fluorenyl)silane zirconium dichloride, $(CH_3)_2Si(Flu)_2ZrCl_2$, as catalyst. The above mentioned European patent application EP-A-604917 describes said atactic polymer, the polymerization process, and the catalyst system.

Polymer B: atactic propylene homopolymer, totally soluble in xylene, and having an intrinsic viscosity of 2.03 dL/g.

Polymer C: atactic propylene homopolymer, totally soluble in xylene, and having an intrinsic viscosity of 1.47 dL/g.

Polymer D: atactic propylene homopolymer, totally soluble in xylene, and having an intrinsic viscosity of 1.15 dL/g.

Polymer E: amorphous propylene copolymer with 39.6% by weight of butene, totally soluble in xylene, and having an intrinsic viscosity of 2.37 dL/g.

Polymer F: amorphous propylene copolymer with 55.6% by weight of hexene-1, totally soluble in xylene, and having an intrinsic viscosity of 1.65 dL/g.

Polymer G: (comparison): amorphous propylene homopolymer containing 15% by weight of a low molecular weight crystalline fraction insoluble in xylene, and having an intrinsic viscosity of 0.5 dL/g; the homopolymer is the by-product, separated by washing, of the production of isotactic polypropylene obtained with a low yield catalyst.

Polymer H: (comparison): amorphous propylene copolymer with 24.7% by weight of ethylene, containing 10% by weight of a low molecular weight crystalline fraction insoluble in xylene, and having an intrinsic viscosity of 0.87 dL/g; said copolymer is the by-product, separated by washing, of the production of ethylene-propylene random copolymers, with low ethylene content, obtained by using a low yield catalyst.

Polymer I: ethylene-propylene rubber, containing 63% by weight of ethylene, totally soluble in xylene, and having an intrinsic viscosity of 1.6 dL/g; said polymer is produced with the ethylene bis(tetrahydroindenyl) zirconium dichloride catalyst.

Polymer L: heterophasic polymer composition having MI of 4 g/min, and a flexural modulus of elasticity of 100 MPa, comprising (percentages by weight):

1) 30% of a crystalline propylene copolymer with 3.3% ethylene, 94% insoluble in xylene; and
2) 70% of a propylene-ethylene copolymer fraction containing 27% of ethylene, 95% soluble in xylene.

Polymer M: heterophasic polymer composition having an MI of 8 dg/min (at 230° C. with 2.16 kg), and comprising (percentages by weight):

1) 30% of a crystalline propylene copolymer with 3.5% of ethylene, 96% soluble in xylene; and
2) 70% of a propylene-ethylene copolymer fraction containing 27% of ethylene, 95% soluble in xylene.

Polymer N: heterophasic polymer composition having an MI of 6 dg/min, and comprising (percentages by weight):

a) 45% of a propylene-ethylene random copolymer containing 3.5% of ethylene, 94% insoluble in xylene; and
b) 55% of a ethylene-propylene copolymer containing 27% of ethylene, and having an intrinsic viscosity of 2.3 dL/g; said fraction is 95% soluble in xylene.

Polymer O: atactic propylene homopolymer, totally soluble in xylene, and having an intrinsic viscosity of 1.6 dL/g;

Polymer P: amorphous propylene copolymer with 66.8% by weight of 1-octene, completely soluble in xylene, and having an intrinsic viscosity of 1.6 dL/g.

The polymers B-F, O, and P have values of "%(r)−%(m)" ranging from 16.9 to 18.7, and of B equal to 0.99. The polymerization of said polymers was carried out by using the same process used to prepare polymer A, and using homogeneous catalysis with the same zirconium catalyst or catalysts described in European patent application EP-A-604908, with exception of polymers C and D, which were obtained with the ethylene bis(9-fluorenyl)silane zirconium dichloride catalyst described in European patent application EP-A-524624 on behalf of Philips.

Polymers L, M, and N were prepared by way of sequential polymerization using a high yield and highly specific Ziegler-Natta catalyst supported on $MgCl_2$.

The atactic or amorphous polymers used in the mixtures of the present invention have good adhesive strength even cold, as shown in the peeling tests (table 2) where the adhesive strength of polymers O and P is compared with that of other amorphous polymers.

TABLE 2

| Polymer | Peeling (kg/cm) |
|---|---|
| Polymer O [η] = 1.6 dL/g | 1.04 |
| Polymer P [η] = 1.6 dL/g | 0.115 |
| Polymer H [η] = 0.87 dL/g | <0.1 |
| Degraded natural rubber [η] = 1.58 dL/g | 0.458 |
| Vestoplast 891[1] [η] = 0.75 dL/g | 0.159 |
| Vistanex MML 100[2] [η] = 3.77 dL/g | 0.957 |

[1]ethylene-propylene-(1-butene) random terpolymer sold by Huls;
[2]polyisobutylene homopolymer sold by Exxon.

Preparation for the bitumen/polymer mixtures 500 g of bitumen pre-heated to 160° C. are introduced in a Silverson L4R mixer inserted in a heating mantle with a constant temperature of 180° C. The top of the mixer is equipped with a homogenizer running at 400 rpm. After the bitumen is heated to 180° C. and kept at that temperature for 10 minutes, one or more polymers are added; the mixing is continued for 3 hours. At the end of the mixing cycle the samples to be subjected to the various tests are prepared directly by way of pouring.

The types of polymers and the type of bitumen used are indicated in the examples.

Tables 3–7 show the types of mixtures and their properties using three types of bitumen mentioned above and polymers B-L. The quantity of polymer in said mixtures is always 5% by weight respect to the weight of the mixture, except for the mixture of table 7. Said mixtures are suitable to be used paving.

EXAMPLE 1–5

Table 3 shows the properties of the mixtures prepared by using VB bitumen and B-F polymers.

TABLE 3

| Example | Polymer | B&R °C. | Penetration dmm | Ductility % |
|---|---|---|---|---|
| 1 | B | 50 | 64 | 30 |
| 2 | C | 50 | 80 | 30 |
| 3 | D | 49 | 88 | 20 |
| 4 | E | 57 | 90 | 25 |
| 5 | F | 51 | 96 | 15 |

EXAMPLE 6

Table 4 shows the properties of a mixture made with an SR-4 bitumen.

TABLE 4

| Polymer | B&R | Penetration dmm | Ductility % |
|---|---|---|---|
| Polymer B | 54 | 69 | 45 |

COMPARATIVE EXAMPLES 1c AND 2c

Table 5 shows the properties determined on two comparison mixtures where either Polymer G or Polymer H has been added to the VB bitumen.

TABLE 5

| Comparative Examples | Polymer | B&R °C. | Penetration dmm | Ductility % |
|---|---|---|---|---|
| 1c | G | 46 | 150 | 5 |
| 2c | H | 47 | 120 | 10 |

COMPARATIVE EXAMPLES 3c AND 4c

Table 6 shows the propertied determined on two comparison mixtures produced like the mixtures of table 4. In said mixtures the bitumen used is of the SR-2 type; the polymers used are indicated in the table.

TABLE 6

| Comparative Examples | Polymer | B&R °C. | Penetration dmm | Ductility % |
|---|---|---|---|---|
| 3c | G | 47 | 145 | 10 |
| 4c | H | 49 | 114 | 20 |

EXAMPLES 7 and 8

Table 7 shows the properties determined on two mixtures suitable to be used for road paving. Said mixtures are prepared by mixing VB bitumen with either (1) Polymer D and Polymer I, respectively in quantities of 1.4% and 2.1% by weight respect to the weight of the bituminous mixture, or (2) Polymer D and Polymer L, respectively in quantities of 2% and 3% by weight with respect to the weight of the bituminuos mixture.

TABLE 7

| Example | Polymer | B&R °C. | Penetration dmm | Ductility % |
|---|---|---|---|---|
| 7 | D + I | 50 | 86 | 35[1] |
| 8 | D + L | 50 | 67 | 55 |

[1]The sample broke.

EXAMPLES 9–11 AND COMPARATIVE EXAMPLES 5c AND 6c

The formulations in Table 8 concern mixtures containing bitumen and an atactic polymer selected from polypropylene homopolymer (polymer 1°) having an intrinsic viscosity of 1.96 dL/g, and propylene copolymer (Polymer F), and from heterophasic polymer compositions (Polymer M or N).

The same table also contains comparison mixtures comprising amorphous propylene homopolymer (homoPP), amorphous propylene copolymers (coPP), and isotactic polypropylene (PP) produced with Ziegler-Natta catalysts.

Said mixtures can be used for waterproofing coatings for roofs.

Table 9 shows the properties of the mixtures of Table 8 prepared at a temperature of 180° C with 70 minutes dissolution times, except for mixture 6c whose dissolution time was 90 minutes.

The Brookfield viscosity of said mixtures is clearly lower than the viscosity of the comparison mixtures, which makes it possible for the mixtures of the present invention to be filled with additional additives (such as inert mineral fillers) while maintaining a low viscosity.

The values of the other properties show how the mixtures of the present invention are basically equivalent to the comparison mixtures.

TABLE 8

| Examples | 9 | 10 | 11 | 5c | 6c |
|---|---|---|---|---|---|
| Bitumen 180/200 | 85 | 85 | 85 | 79 | 82 |
| Polymer 1° | 6 | 0 | 7.5 | 0 | 0 |
| Polymer F | 0 | 6 | 0 | 0 | 0 |
| Polymer M | 9 | 9 | 0 | 0 | 0 |
| Polymer N | 0 | 0 | 7.5 | 0 | 0 |
| Isotactic PP[1] | 0 | 0 | 0 | 4.5 | 4.0 |
| amorphous homoPP[2] | 0 | 0 | 0 | 12 | 6 |
| amorphous coPP[2] | 0 | 0 | 0 | 4.5 | 6 |
| Polyethylene[) ] | 0 | 0 | 0 | 0 | 3 |
| Calcium carbonate | 0 | 0 | 0 | 0 | 20 |

[1]recovered polymers;
[2]by-products of the production of isotactic polypropylene with low yield catalysts.

TABLE 9

| Examples | 9 | 10 | 11 | 5c | 6c |
|---|---|---|---|---|---|
| Penetration at 25° C.[1] (dmm) | 35 | 40 | 34 | 32 | 26 |
| Penetration at 60° C.[1] (dmm) | >165 | >195 | >195 | 170 | 89 |
| B&R[2] (°C.) | 135 | 130 | 139 | 153 | 150 |

TABLE 9-continued

| Examples | 9 | 10 | 11 | 5c | 6c |
|---|---|---|---|---|---|
| Instantaneous Shore A hardness (points) | — | — | 75 | — | 85 |
| Brookfield viscosity 180° C. (cP.s) | 1450 | 500 | 1600 | 3300 | 4500 |
| Cold flexural strength (°C.) | −13 | −13 | −10 | −13 | −15 |
| Cold flexural strength after 7 days at 80° C. (°C.) | 0 | 0 | 0 | 0 | +5 |

[1])ASTM D 5/73 method;
[2])ASTM D 36/76 method

EXAMPLES 12(A), (B), AND (C), AND COMPARATIVE EXAMPLES 7c(A), (B), (C), 8c (A), (B), (C)

The mixture of example 11, that of comparative example 6c, and the commercial waterproof coating composition "Bituthene" (marketed by Grace Construction Products) are subjected to the adhesive strength test. The results of said test are shown in table 10.

The commercial composition Bituthene is used for applications at ambient temperature, and has an instantaneous Shore A hardness of 20 points.

Said test is carried out on samples cut out from plaques produced as follows: with the above mentioned mixtures one prepares 2 mm thick plaques by way of compression molding at temperatures adequate for the type of material utilized, and using two sheets of teflon in order to avoid any possible adhesion. Then the plaque is made to adhere to a support made of three sheets of aluminum (each 0.1 mm thick). Said sheets are glued to each other and to the plaque by using a polymer modified with maleic anhydride. The plaque obtained in this manner is subjected to compression molding first for 3 minutes at 200° C. and at atmospheric pressure, and then for 3 minutes with a pressure of 50 Bar. The resulting plaque, which has a thickness of 3 mm, 1.8 mm of which are made up by the mixture, is covered with a polyethylene film for 24 hours at 23° C. It is then handpunched, according to method ASTM D-412, type C, and then cut from the middle portion of the plaque into samples for the test. Said samples are 40 mm long and 6 mm thick.

In the test for the adhesiveness to each other, two of the samples obtained as described above are fixed, at right angle to each other, to a Tel-tek dynamometer produced by Monsanto, after the protective polyethylene film has been removed. The contact surface of the two samples is 36 mm$^2$ (6×6 mm). The weight on the surface of the sample, called "contact pressure", is 453 g. The contact time is set at 10, 40, and 70 seconds. In said test, carried out at 23° C., the separation rate of the samples is 25.4 mm/min. The force needed to separate the samples is measured with a calibrated dynamometer. The maximum force is called "adhesive strength".

EXAMPLE 13 AND COMPARATIVE EXAMPLES 9c AND 10c

The mixture of example 11, that of comparative example 6c, and the commercial composition Bituthene are subjected to the adhesive test on steel, and the results are shown in table 10. The same procedure used in example 12 is used for the above mentioned examples, with the exception that in the adhesive strength test one of the two samples used in the preceding examples is substituted with a chrome-plated steel sample of the same dimensions. The contact time is set at 40 seconds.

EXAMPLE 14 AND COMPARATIVE EXAMPLES 11c AND 12c

The mixtures of example 11 and comparative example 6c together with the Bituthene composition are subjected to the separation test whose results are shown in table 10. Evaluated in these examples are the time necessary for separation or breaking of the samples due to the mere weight of the clamps; the samples used are prepared as described in example 12; the contact time of the clamps is 40 seconds. After contact, the lower clamp is disengaged from the pulling screw, so that the separation of the two samples is due only to the weight of the clamp, i.e., 340 g, that places a load on the bottom of the sample.

TABLE 10

| Properties | Examples & comp. examples | Contact time | Mixture ex. 11[1)] | Mixture ex. 6c[2)] | Bituthene[3)] |
|---|---|---|---|---|---|
| Adhesiveness to itself (kg/cm$^2$) | 12(A) | 10 | 1.26[4)] | — | — |
| | 7c(A) | | — | 0.94 | — |
| | 8c(A) | | — | — | 1.89[5)] |
| | 12(B) | 40 | 2.04[4)] | — | — |
| | 7c(B) | | — | 1.81 | — |
| | 8c(B) | | — | — | 1.89[5)] |
| | 12(C) | 70 | 2.04[4)] | — | — |
| | 7c(C) | | — | 2.04 | — |
| | 8c(C) | | — | — | 1.89[5)] |
| adhesiveness to steel (kg/cm$^2$) | 13 | 40 | 2.04[4)] | — | — |
| | 9c | | — | 0.84 | — |
| | 10c | | — | — | 1.73[5)] |
| break or separation time (min) | 14 | 40 | 0.67[4)] | — | — |
| | 11c | | — | 0.17 | — |
| | 12c | | — | — | 0.33[5)] |

[1)]Brookfield viscosity at 180° C.: 1600 cPa.s;
[2)]Brookfield viscosity at 180° C.; 4500 cPa.s;
[3)]Brookfield viscosity at 180° C.; <1000 cPa.s;
[4)]The membrane broke;
[5)]Strings formed but the membrane did not break.

Other features, advantages and embodiments of the invention disclosed herein will be readily apparent to those exercising ordinaly skill after reading the foregoing disclosures. In this regard, while specific embodiments of the invention have been described in considerable detail, variations and modifications of these embodiments can be effected without departing from the spirit and scope of the invention as described and claimed.

We claim:

1. A mixture comprising bitumen and at least one polymer selected from (A) an essentially atactic propylene homopolymer, (B) an amorphous propylene copolymer with a $C_4$–$C_{10}$ α-olefin, and (C) an amorphous propylene copolymer with ethylene; said polymers (A) and (B) having the following characteristics:

intrinsic viscosity (η) : greater than 1 dl/g;
   % (r)–% (m)>0, where % (r) is the percentage of the syndiotactic dyads, and % (m) is the percentage of the isotactic dyads;
   less than 2% of the $CH_2$ groups are contained in the $(CH_2)_n$ sequences where n≧2; and
   Bernoulli index (B)=1±0.2;

said copolymer (C) having the following characteristics:
   the quantity of propylene in the copolymer (%P) expressed in mole percentage, and the EPE/(EPE+ PPE+PPP) triad ratio satisfy the following equation:

$$0.01\% \ P + EPE/(EPE+PPE+PPP) \geq 1;$$

and less than 2% of the $CH_2$ groups are contained in the $(CH_2)_n$ sequences where n is an even number.

2. The mixture of claim 1 where the quantity of ethylene or $C_4$–$C_{10}$ α-olefin in the amorphous propylene copolymers ranges from 10 to 70% by weight.

3. The mixture of claim 1 where the α-olefins of the amorphous copolymers (B) are linear or branched, and are selected from 1-butene, 1-pentene, 4-methyl-1-pentene, 1-hexene, and 1-octene.

4. The mixture of claim 1 where the quantity of essentially atactic propylene homopolymer (A) or amorphous copolymer (B) or (C) ranges from 1 to 40% by weight with respect to the total weight of the mixture.

5. The mixture of claim 1, further comprising at least one olefin or nonolefin polymer selected from amorphous polymers, heterophasic polymer compositions, crystalline polyolefins, low or high density polyethylene, styrene-butene-styrene copolymers, and ethylene polyvinyl acetate.

6. The mixture of claim 5 where the total quantity of polymers is less than or equal to 40% by weight with respect to the total weight of the mixture.

7. The mixture of claim 5, where the olefin or nonolefin polymer is present in a quantity equal to or greater than 0.5% by weight with respect to the weight of the mixture.

8. The mixture of claim 5, where the olefin polymer is selected from crystalline and amorphous polyolefins, and is present in quantities ranging from 0.5 to 9% by weight with respect to the weight of the mixture.

* * * * *